United States Patent [19]

Kimura et al.

[11] Patent Number: 5,945,369
[45] Date of Patent: *Aug. 31, 1999

[54] CATALYST FOR PURIFYING EXHAUST GASES AND PROCESS FOR PRODUCING THE SAME

[75] Inventors: Mareo Kimura, Nagoya; Yoriko Matsuoka; Hideo Sobukawa, both of Nisshin; Masayuki Fukui, Toyoake; Akihiko Suda, Seto; Toshio Kandori, Seto; Yoshio Ukyo, Seto, all of Japan

[73] Assignee: Kabushiki Kaisha Toyota Chuo Kenkyusho, Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,396

[22] Filed: Dec. 8, 1995

[30] Foreign Application Priority Data

Dec. 9, 1994 [JP] Japan .................................. 6-306265
Apr. 13, 1995 [JP] Japan .................................. 7-113789

[51] Int. Cl.$^6$ .............................. B01J 23/10; B01J 23/38
[52] U.S. Cl. ......................... 502/304; 502/325; 502/339; 502/349
[58] Field of Search .................. 502/304, 349, 502/325, 339

[56] References Cited

U.S. PATENT DOCUMENTS 5,260,249  11/1993  Shiraishi et al. ........................ 502/304
5,626,826   5/1997  Chopin et al. ........................ 423/213.1

FOREIGN PATENT DOCUMENTS 0 272136   6/1988  European Pat. Off. .
0 337809  10/1989  European Pat. Off. .
0 507590  10/1992  European Pat. Off. .
37 37419   5/1988  Germany .
39 13972  11/1989  Germany .
58-20307   4/1983  Japan .
60-110334  6/1985  Japan .
4-55315    2/1992  Japan .
4-284847  10/1992  Japan .
6-279027  10/1994  Japan .

*Primary Examiner*—Michael Lewis
*Assistant Examiner*—Alexander G. Ghyka
*Attorney, Agent, or Firm*—Oblon, Spivak, McClelland, Maier & Neustadt, P.C.

[57] ABSTRACT

A catalyst for purifying exhaust gases includes a porous support; a cerium oxide or a solid solution of a cerium oxide and a zirconium oxide in a state of mutual solid solution, loaded on the porous support; and a noble metal element loaded on the porous support. The cerium oxide or the solid solution has an average particle diameter of from 5 to 100 nm. The cerium oxide is present in the solid solution in an amount of from 0.2 to 4.0 by molar ratio with respect to the zirconium oxide therein. The catalyst can be prepared by: coating and calcinating on a support substrate a slurry of a cerium oxide sol, a cerium oxide sol and a zirconium oxide sol, on a solid solution powder of a cerium oxide and a zirconium oxide in a state of mutual solid solution; and loading a noble metal element thereon. The cerium oxide or its solid solution has a surface area large enough to effect an oxygen storage function, and has an average particle diameter large enough to prevent the same from entering deeply into fine pores of a porous support, thereby providing a catalyst fully exhibiting both of the oxygen storage capability and the catalytic activity.

34 Claims, 2 Drawing Sheets

CATALYST FOR PURIFYING EXHAUST GASES AND PROCESS FOR PRODUCING THE SAME

BACKGROUND OF THE INVENTION

1. Field of the Invention

The present invention relates to a catalyst for purifying the 3 major components (i.e., hydrocarbons (HC), carbon monoxide (CO), and nitrogen oxides ($NO_x$)), which are included in exhaust gases emitted from internal combustion engines for automobiles or the like, and a process for producing the same. More particularly, it relates to a catalyst, which can efficiently purify the 3 major components even under a fluctuating atmosphere condition, and which exhibits good heat resistance, and a process for producing the same. Note that the term "fluctuating atmosphere condition" herein means that oxidizing atmosphere and reducing atmosphere arise alternately in automotive exhaust gases.

2. Description of Related Art

As catalysts for purifying automotive exhaust gases, there have been employed 3-way catalysts so far which oxidize CO and HC and simultaneously reduce $NO_x$ to purify the exhaust gases. For example, the 3-way catalysts have been known widely which comprise a heat resistant support formed of cordierite, a porous catalyst carrier layer formed of gamma-alumina and disposed on the support, and a noble metal element selected from the group consisting of platinum, palladium and rhodium and loaded on the porous catalyst carrier layer.

Japanese Examined Patent Publication (KOKOKU) No. 58-20,307 discloses a novel 3-way catalyst whose catalytic performance is enhanced by co-employing cerium oxide (or ceria) having an oxygen storage capability as a promoter.

When loading cerium oxide working as a promoter on a porous support, an impregnation loading process and a powder mixture loading process are available. In an impregnation loading process, a monolithic support having an alumina coating layer is adsorbed by using an aqueous solution of cerium compound (e.g., cerium nitrate), and is calcinated thereafter. In a powder mixture loading process, which is an improvement of the impregnation process, a cerium oxide powder and a porous support powder, such as an alumina powder, are mixed to load cerium oxide on alumina as set forth in Japanese Unexamined Patent Publication (KOKAI) No. 60-110,334.

Moreover, Japanese Unexamined Patent Publication (KOKAI) No. 6-279,027 discloses another mixture loading process, in which a cerium oxide sol and a zirconium oxide sol are mixed to prepare a catalyst or a catalyst support as set forth in "Supplemental Comparative Example" below. Note that this publication claims the Paris Convention Priority based on a French Application No. FR9301450, which was filed on Feb. 10, 1993.

In accordance with the impregnation loading process, the cerium oxide is turned into extremely fine particles, and can be loaded in a highly dispersed manner. The resulting automotive catalyst accordingly seems to effect the oxygen storage capability of cerium oxide maximally. In fact, however, the specific surface area of the catalyst decreases, because major part of the cerium oxide is loaded in the pores of the porous support to close the pores. Further, the cerium oxide contacts with exhaust gases at reduced probability to ineffectively effect its oxygen storage capability, because the cerium oxide is adsorbed and loaded deep in the pores. Furthermore, the specific surface area of the catalyst degrades further, because the highly dispersed cerium oxide contacts with the porous support over an increased area. Thus, the cerium oxide is likely to react with the porous support to form cerium oxide-aluminate ($CeAlO_3$) if the porous support is formed of alumina.

In accordance with the powder mixture loading process, the resulting catalyst cannot satisfactorily utilize the oxygen storage capability of the cerium oxide; namely, it cannot keep the exhaust gases in predetermined atmosphere by storing oxygen in and releasing oxygen from the cerium oxide, because cerium oxide powder has such a large average particle diameter of 500 nm or more that the cerium oxide has a small specific surface area for contacting with the exhaust gases.

Thus, when the cerium oxide is loaded by either the impregnation loading process or the powder mixture loading process, the cerium oxide cannot fully effect its oxygen storage capability. Accordingly, the resulting catalyst cannot satisfactorily produce activities as 3-way catalyst.

SUMMARY OF THE INVENTION

The present invention has been developed in view of the aforementioned circumstances. It is an object of the present invention to obviate the drawbacks of the impregnation loading process and the powder mixture loading process, thereby providing a catalyst, which can utilize the oxygen storage capability of cerium oxide maximally to improve its 3-way catalytic performance, and a process for producing the same.

A catalyst according to a first aspect of the present invention can fulfill the object, and comprises:

a porous support;

a cerium oxide loaded on the porous support, and having an average particle diameter of from 5 to 100 nm, the average particle diameter being large enough to prevent most of the cerium oxide from entering pores of the porous support; and a noble metal element loaded on the porous support.

In the catalyst according to the first aspect, the cerium oxide is capable of storing and releasing oxygen. For instance, the cerium oxide stores oxygen in oxidizing atmosphere, and releases oxygen in reducing atmosphere. Thus, the cerium oxide keeps exhaust gases from fluctuating atmospherically around the stoichiometric point. As a result, the catalyst is improved in terms of catalytic performance.

In particular, in the catalyst according to the first aspect, the cerium oxide loaded on the porous support has an average particle diameter of from 5 to 100 nm. This average particle diameter is much smaller than that of the cerium oxide which is loaded by the powder mixture loading process. Accordingly, the cerium oxide is loaded to highly disperse on the porous substrate. As a result, the cerium oxide produces a satisfactorily large contacting area with exhaust gases, and effects its oxygen storage capability sufficiently.

Further, the average particle diameter of the cerium oxide is relatively larger so that the cerium oxide cannot go into the pores of the porous support. Accordingly, the cerium oxide contacts with the porous support over a reduced contacting area. As a result, the cerium oxide is inhibited from closing the pores of the porous support and producing the cerium oxide-aluminate. Hence, the resulting catalyst fully effects both of the oxygen storage capability and the 3-way catalytic activity, and exhibits improved catalytic performance.

In accordance with the first aspect, the cerium oxide can be upgraded in terms of oxygen storage-release capability, and can be inhibited from closing the pores of the porous support so as to decrease the specific surface area of the porous support. As a result, the resulting catalyst can exhibit high 3-way catalytic performance even under the fluctuating atmospheric condition.

A catalyst according to a second aspect of the present invention can further improve the advantageous effects of the first aspect, and comprises:

a porous support;

a solid solution in which a cerium oxide and a zirconium oxide are present in a state of mutual solid solution, and the cerium oxide is present in an amount of from 0.2 to 4.0 by molar ratio with respect to the zirconium oxide, the solid solution being loaded on the porous support and having an average particle diameter of from 5 to 100 nm, the average particle diameter being large enough to prevent most of the solid solution from entering pores of the porous support; and a noble metal element loaded on the porous support.

In the catalyst according to the second aspect, the cerium oxide forms the solid solution together with the zirconium oxide, and the solid solution has an average particle diameter of from 5 to 100 nm. Thus, in addition to the advantageous effects produced by the first aspect, the resulting catalyst is improved in terms of heat resistance, because the cerium oxide is inhibited from sintering by solid-solving the cerium oxide and the zirconium oxide, which is superior to the cerium oxide in terms of heat resistance.

Further, in the catalyst according to the second aspect, the cerium oxide is further inhibited from producing the cerium-aluminate, because it is lowered in terms of reactivity to the porous support by solid-solving the zirconium oxide in the cerium oxide.

Furthermore, in the catalyst according to the second aspect, the cerium oxide is present in the solid solution in an amount of from 0.2 to 4.0 by molar ratio with respect to the zirconium oxide therein. By thus optimizing the amount of the cerium oxide, the heat resistance and the oxygen storage capability are well balanced in the resulting catalyst. Accordingly, the resulting catalyst can maximally utilize the functions of the cerium oxide and the zirconium oxide.

In accordance with the second aspect, it is possible to provide a catalyst of high heat resistance.

A process for producing a catalyst according to a third aspect of the present invention is adapted to produce the catalyst according to the first aspect, and comprises the steps of:

preparing a slurry of a porous support powder and a cerium oxide sol;

coating and calcinating the slurry on a surface of a support substrate so as to form a coating layer comprising a cerium oxide having an average particle diameter of from 5 to 100 nm thereon; and loading a noble metal element on the coating layer.

In the process according to the third aspect, the coating layer is formed of the slurry, which includes the cerium oxide sol. After coating and calcinating the slurry on the support substrate, the loaded cerium oxide can readily have an average particle diameter of from 5 to 100 nm, because the cerium oxide exists as colloid in the cerium oxide sol and comprises micro-fine particles of extremely small particle diameter. As a result, it is possible to stably and readily produce the catalyst according to the first aspect.

In accordance with the process according to the third aspect, it is possible to stably and readily produce the catalyst according to the first aspect, on which the cerium oxide is loaded as micro-fine particles of extremely small average particle diameter in a highly-dispersed manner.

A process for producing a catalyst according to a fourth aspect of the present invention is adapted to produce the catalyst according to the second aspect, and comprises the steps of:

preparing a slurry of a porous support powder, a cerium oxide sol and a zirconium oxide sol;

coating and calcinating the slurry on a surface of a support substrate so as to form a coating layer comprising a solid solution in which a cerium oxide and a zirconium oxide exist in a state of mutual solid solution, and the cerium oxide is present in an amount of from 0.2 to 4.0 by molar ratio with respect to the zirconium oxide;

the solid solution having an average particle diameter of from 5 to 100 nm; and loading a noble metal element on the coating layer.

In the process according to the fourth aspect, the coating layer is formed of the slurry, which includes the cerium oxide sol and the zirconium oxide sol. After coating and calcinating the slurry on the support substrate, in a manner similar to the third aspect, the loaded solid solution can readily have an average particle diameter of from 5 to 100 nm, because the cerium oxide and the zirconium oxide are present as colloid in the cerium oxide and zirconium oxide sols, and because the sols comprise micro-fine particles of extremely small particle diameter. As a result, it is possible to stably and readily produce the catalyst according to the second aspect.

Further, a process for producing a catalyst according to a fifth aspect of the present invention is also adapted to produce the catalyst according to the second aspect, and comprises the steps of:

preparing a slurry of a porous support powder and a cerium oxide sol;

coating and calcinating the slurry on a surface of a support substrate so as to form a cerium oxide coating layer thereon;

impregnating a solution of a zirconium oxide compound into the coating layer, and calcinating the impregnated coating layer to obtain a solid solution of a cerium oxide and a zirconium oxide, the solid solution having an average particle diameter of from 5 to 100 nm and a molar ratio of the cerium oxide to the zirconium oxide in a range of from 0.2 to 4.0; and loading a noble metal element on the coating layer.

In the process according to the fifth aspect, the coating layer is first formed of the slurry, which includes the cerium oxide sol. After coating and calcinating the slurry on the support substrate, in a manner similar to the third aspect, the loaded cerium oxide can readily have an average particle diameter of from 5 to 100 nm. Then, the solid solution including the cerium oxide and the zirconium oxide is prepared by impregnating the solution of zirconium oxide compound into the coating layer, and calcinating the zirconium oxide compound therein. Consequently, the solid solution, formed of cerium oxide and zirconium oxide, can readily have an average particle diameter of from 5 to 100 nm, because the zirconium oxide is dispersed highly in the coating layer, and because it contacts with the cerium oxide in such a highly-dispersed manner that the solid solution is less likely to grow granularly. As a result, it is possible to stably and readily produce the catalyst according to the second aspect.

Furthermore, a process for producing a catalyst according to a sixth aspect of the present invention is also adapted to produce the catalyst according to the second aspect, and comprises the steps of:

preparing a slurry of a porous support powder and a solid solution powder in which a cerium oxide and a zirconium oxide exist in a state of mutual solid solution, and particles in an amount of 50% by weight or more therein have an average particle diameter of 100 nm or less;

coating and calcinating the slurry on a surface of a support substrate so as to form a coating layer of a solid solution having an average particle diameter of from 5 to 100 nm, the solid solution comprising the cerium oxide and the zirconium oxide in a state of mutual solid solution, the cerium oxide being present in an amount of 0.2 to 4.0 by molar ratio with respect to the zirconium oxide; and loading a noble metal element on the coating layer.

In the process according to the sixth aspect, the coating layer is first formed of the slurry which comprises the solid solution powder. The solid solution powder includes cerium oxide and zirconium oxide which are solid-solved in the solid solution powder. After coating and calcinating the slurry on the support substrate, the solid solution can readily have an average particle diameter of from 5 to 100 nm, because the solid solution powder includes the micro-fine particles which have an average diameter of 100 nm or less, in an amount of 50% by weight or more therein. As a result, it is possible to stably and readily produce the catalyst according to the second aspect.

In accordance with the process according to the fourth, fifth or sixth aspect, it is possible to stably and readily produce the catalyst according to the second aspect, on which the cerium oxide is loaded as micro-fine particles of extremely small average particle diameter in a highly-dispersed manner, and whose specific surface area decreases less at elevated temperatures.

In the present invention, the material for the porous support is not limited in particular. The porous support can be formed of at least one member selected from the group consisting of alumina, silica, silica-alumina, zirconia, and titania (or titanium oxide). Among them, it is especially preferable to employ alumina.

In the present invention, the cerium oxide or the solid solution can be preferably loaded on the porous support in an amount of from 10 to 200 grams with respect to 100 grams of said porous support.

When the cerium oxide or the solid solution including cerium oxide and zirconium oxide has an average particle diameter of less than 5 nm, the cerium oxide or the solid solution can be loaded to highly disperse on the porous support, but closes the pores of the porous support. In particular, at elevated temperatures, the cerium oxide produces aluminate to decrease the specific surface area of the resulting catalyst. When the cerium oxide or the solid solution has an average particle diameter of more than 100 nm, the cerium oxide or the solid solution is inhibited from closing the pores and producing aluminate, but contacts with exhaust gases over a reduced contacting area to degrade the purifying performance of the resulting catalyst. It is further preferred that the cerium oxide or the solid solution has an average particle diameter of 80 nm or less.

When the cerium oxide is present in the solid solution in an amount of less than 0.2 by molar ratio with respect to the zirconium oxide therein, the cerium oxide is absolutely insufficient so that the oxygen storage capability decreases and the catalytic performance of the resulting catalyst deteriorates. When the cerium oxide is present in the solid solution in an amount of more than 4.0 by molar ratio with respect to the zirconium oxide therein, the zirconium oxide is absolutely insufficient so that the heat resistance of the resulting catalyst is improved less.

In the present invention, the noble metal element can preferably be at least one element selected from the group consisting of platinum (Pt), palladium (Pd), and rhodium (Rh). The Pt and/or Pd can preferably be loaded in an amount of from 0.1 to 10 grams with respect to 100 grams of the porous support. The Rh can preferably be loaded in an amount of from 0.01 to 2.0 grams with respect to 100 grams of the porous support. The Rh can further preferably be loaded in a molar ratio of 1.0/0.01 or less with respect to a loading amount of the Pt and/or Pd.

Hereinafter, the solid solution powder of the six aspect (e.g. one of the processes for producing the catalyst of the second aspect) will be described. The solid solution powder includes particles, in which the raw materials (i.e., cerium oxide and zirconium oxide) are solid-solved each other.

The solid solution powder not only includes particles, in which the raw materials (i.e., cerium oxide and zirconium oxide) exist in a state of mutual solid solution, but also includes the particles, which have an average particle diameter of 100 nm or less, in an amount of 50% by weight or more. This powder has a large specific surface area, and reduces the specific surface area less when it is subjected to elevated temperatures. Accordingly, this powder exhibits a high activity, such as an oxygen storage capability, at elevated temperatures. It is further preferred that the powder includes the particles, which have an average particle diameter of 50 nm or less, in an amount of 80% by weight or more. If such is the case, the powder has a much larger specific surface area.

The term "average particle diameter" set forth above can be measured by an electron microscope or a particle-size-distribution meter. As for a principle for determining a particle-diameter distribution, which is suitable for measuring particle diameter, it is possible to exemplify a photon correlation method.

A process for preparing the solid solution powder will be hereinafter described. For example, a process is available, in which a compound including zirconium (hereinafter referred to as a "zirconium compound") and a cerium oxide powder are pulverized by a pulverizer. The pulverizer includes pulverizing media therein. In the pulverizer, the pulverizing media rub each other, or the pulverizing media and component parts of the pulverizer rub each other, thereby pulverizing the zirconium compound and the cerium oxide powder. Thus, the powder wherein the zirconium oxide and the cerium oxide exist in a state of mutual solid solution can be obtained.

In this process, the zirconium oxide can be solid-solved in the cerium oxide sufficiently, because the cerium oxide powder and the zirconium compound are pulverized by means of rubbing forces.

It is still under investigation what causes this advantageous effect. However, it is assumed as follows; namely: the pulverizing media rub each other, or the pulverizing media and component parts of the pulverizer rub each other, whereby the raw material powders are pulverized. Accordingly, the raw material powders receive a large pulverizing energy, and particles being pulverized have microscopically a higher temperature than the average temperature of the entire raw material powders. Further, the diffusion of elements (e.g., zirconium and oxygen) into the cerium oxide particles is promoted by the stresses which the particles receive during the pulverizing operation.

Furthermore, the thus pulverized raw material particles rub each other heavily. These actions form an amorphous phase on the surface of the cerium oxide particles, through which the elements are effectively taken into the internal crystalline lattices. The mutual solid solution of the materials in the solid solution is thus promoted. Note that the temperature of the particles being pulverized is high, but the average temperature of the entire raw material powders does not rise abruptly. Consequently, the raw material powders are inhibited from growing granularly and sintering each other.

In particular, when the zirconium compound is oxide, it solid-solves as oxide in the cerium oxide. When the zirconium compound is other than oxide, it reacts with oxygen, which is present in pulverizing atmosphere, turns into zirconium oxide, and then solid-solves in the cerium oxide. Note that, when the raw material powders are pulverized together with a dispersing medium, the oxygen, being present in the dispersing medium, contributes to the reaction.

During the pulverizing operation, the raw material powders (i.e., the cerium oxide powder and the zirconium compound) rub each other to micro-fine particles. When the zirconium oxide solid-solves in the cerium oxide powder, the particles themselves enlarge, but the enlarged particles can be turned into micro-fine particles by the pulverizing operation. Thus, by continuously carrying out the pulverizing operation, the raw material powders can be transformed into the solid solution powder in which the cerium oxide and the zirconium oxide are mutually dissolved, and which includes the micro-fine particles having an average particle diameter of 100 nm or less in an amount of 50% by weight or more.

In particular, no heat treatment is carried out in the pulverizing operation. Accordingly, the particles are inhibited from growing granularly and sintering each other. As a result, it is possible to prepare particles, which have a large specific surface area and a micro-fine particle diameter.

The shape of the raw zirconium compound is not limited in particular. For instance, it can be formed as a powder, a bulk or an aqueous solution. Moreover, when the pulverizing media or the component parts of the pulverizer are formed of a zirconium compound, it is possible to use abraded pieces, which are produced by rubbing during the pulverizing operation, as the raw zirconium compound.

As for the raw zirconium compound, it is possible to exemplify oxide, hydroxide, alkoxide or salt of zirconium.

The raw cerium oxide powder is not limited in particular. Note that, however, it is preferable to use a micro-fine porous cerium oxide powder, which has a small primary particle diameter and is less likely to cause secondary agglomeration.

The apparatus, in which the pulverizing media are present, is adapted for pulverizing and solid-solving raw material powders by means of rubbing force. As for the apparatus, it is possible to exemplify an attrition mill (e.g., a horizontal-media-stirring mill), or the like.

The term "pulverizing media" implies balls, rods, rollers, or the like, which contact with component parts of the pulverizing apparatus. The term "component parts of the pulverizing apparatus" indicates a housing, stirring propellers, stirring rods, stirring disks, stirring rollers, which are disposed so as not to contact with the other component parts of the pulverizing apparatus.

The raw material powders can be pulverized by using the pulverizing apparatus, in which the pulverizing media are present. The pulverizing media rub each other, or the pulverizing media and the component parts of the pulverizing apparatus rub each other. Accordingly, the rubbing forces can pulverize the raw material powders.

Specifically, the pulverizing media or the component parts of the pulverizing apparatus rotate or vibrate, and the pulverizing media rub each other, or the pulverizing media and the component parts of the pulverizing apparatus rub each other. As a result, impulsive forces and shearing forces can be applied to the particles of the raw material powders, which are charged in the pulverizing apparatus.

It is preferable to apply stronger impulsive forces and shearing forces to the particles of the raw material powders. Independent ultra-fine particles, which are less likely to agglomerate, can be prepared by applying heavy impulsive forces and shearing forces. Hence, it is much preferable to use a pulverizer, which effectively produces centrifugal acceleration by means of rotation of motor to pulverize, than an ordinary ball mill, which applies acceleration to the pulverizing media mainly by means of gravity resulting in free-falling. For example, such a pulverizer produces a centrifugal acceleration of from 10 to 100 times as much as the gravitational acceleration. It is especially preferable to employ such a pulverizer, which is capable of producing a centrifugal acceleration of 100 times or more of the gravitational acceleration. If such is the case, the pulverizing media can pulverize the particles of the raw material powders much finer with high frequency.

It is naturally possible to use a pulverizer, which does not utilize centrifugal acceleration. For instance, it is possible to use a pulverizer, which utilizes vibrating balls to produce the pulverizing forces (e.g., the impulsive forces and shearing forces), for pulverizing the raw material powders.

It is preferable to make the pulverizing media and the component parts of the pulverizing apparatus from the zirconium compound. If such is the case, the abraded pieces, which are produced by rubbing during the pulverizing operation, can be used as the raw zirconium compound, and consequently the zirconium oxide can be solid-solved in the cerium oxide in a greater amount.

The solid solution powder, which includes the micro-fine particles having an average particle diameter of 100 nm or less in an amount of 50% by weight or more, can be prepared by carrying out the pulverizing operation for a prolonged period of time, or by charging the raw material powders in reduced amounts.

For example, when ordinary raw material powders are pulverized by a ball mill, it is possible to prepare the solid solution powder, which includes the micro-fine particles having an average particle diameter of 100 nm or less in an amount of 50% by weight or more, by carrying out the pulverizing operation for 100 hours or more. When ordinary raw material powders are pulverized by a Dyno mill (a horizontal-media-stirring mill), it is possible to prepare the solid solution powder by carrying out the pulverizing operation for 10 hours or more.

Moreover, when a wet-pulverizing operation was carried out by a Dyno mill and the concentration of the raw material powders is adjusted to 17 g/liter or less, it is possible to prepare the solid solution powder, which includes the micro-fine particles having an average particle diameter of 100 nm or less in an amount of 50% by weight or more, by carrying out the pulverizing operation for 3 to 4 hours. When the pulverizing operation is not carried out in wet manner and the raw material powders were charged in the pulverizing apparatus in an amount of 150 g/liter or less, it is possible to prepare the solid solution powder by carrying out the pulverizing operation for 10 hours or more.

Before pulverizing the raw material powders with the pulverizing apparatus, it is preferable to carry out a heat treatment onto the raw cerium oxide powder in reducing atmosphere. Further, when pulverizing the cerium oxide and the zirconium compound with the pulverizing apparatus, it is preferable to carry out a heat treatment of the cerium oxide powder and the zirconium compound in a reducing atmosphere. With this heat treatment, at least a part of the cerium oxide is turned into the 3-valency state (i.e., $CeO_{2-x}$, 0<x<0.5). When the zirconium compound and the cerium oxide of 3-valency state coexist, the cerium oxide crystals take in the zirconium oxide, thereby promoting mutual solid solution of the cerium oxide and the zirconium oxide in the solid solution.

In particular, when the cerium oxide is heat-treated in reducing atmosphere, the crystalline particles of the cerium oxide release oxygen to cause oxygen deficiency therein. It is believed that the presence of oxygen deficiency further promotes the solid solution of the zirconium oxide in the cerium oxide.

When the heat treatment is carried out, the particles of the raw material powders may grow granularly or sinter each other. However, the granularly-grown or sintered particles are pulverized during the pulverizing operation employing the pulverizing apparatus. Thus, the specific surface area of the resulting solid solution powder decreases less.

The following processes are available for heat-treating the cerium oxide powder in reducing atmosphere.

For instance, the cerium oxide powder is charged in an oven, and it is heat-treated in vacuum of $10^{-2}$ Torr or less which is produced by a hydraulic rotary oil pump. If this process is employed, it is preferable to increase the vacuum by a hydraulic diffusion pump, a turbo molecular pump, or the like. Note that the oven can be an oven in which graphite is present, an oven whose heater or insulator is made from graphite, or an oven in which graphite powder is charged.

Further, the cerium oxide can be charged in an ordinary oven in which a reducing gas is flowed or sealed, and it can be heat-treated therein. Note that the reducing gas can be, for example, a CO gas, an $H_2$ gas, or a hydrocarbon gas, such as a $CH_4$ gas and a $C_2H_4$ gas.

It is preferable to carry out the heat treatment in a temperature range of from 300 to 1,200° C. When the particles of the raw material powders are inhibited from growing granularly and sintering each other, the pulverizing operation can be carried out by the pulverizing apparatus with improved efficiency. Accordingly, it is preferable to keep the temperature of the heat treatment as low as possible.

In addition, when thermally treating the cerium oxide powder in reducing atmosphere prior to the pulverizing operation, the cerium oxide can be reduced independently in reducing atmosphere. It is further preferable to carry out the heat treatment in the following manner.

Namely, it is preferable to let the cerium oxide powder and the zirconium compound coexist by mixing them with an ordinary mixer, such as a ball mill, before carrying out the heat treatment. Further, it is also preferable to co-precipitate a cerium compound and the zirconium compound before carrying out the heat treatment. If such is the case, the solid-solving develops in the heat treatment as well. Note that, when the cerium compound and the zirconium compound are co-precipitated before carrying out the heat treatment in reducing atmosphere, the cerium compound (e.g., a cerium salt) is turned into cerium hydroxide in the co-precipitation, and thereafter the cerium hydroxide is transformed into the cerium oxide powder in the subsequent heat treatment.

Note that the heat treatment can be carried out onto the mixture in which the cerium oxide powder and the zirconium compound coexist, in the same manner as the cerium oxide powder is heat-treated independently.

In addition, it is preferable to add a reducing agent when pulverizing the raw material powders with the pulverizing apparatus. The reducing agent reduces the cerium oxide so as to facilitate solid-solving the zirconium oxide in the cerium oxide. It is believed that the facilitated solid-solving results from mechanochemical phenomena.

It is preferable to employ an agent, which can at least partially reduce the cerium oxide to the 3-valency-state cerium oxide (i.e., $CeO_{2-x}$, 0<x<0.5), for the reducing agent. For instance, it is possible to name alcohol, glycol, glycerin, and aldehyde. The alcohol can be methanol, ethanol, isopropanol, or the like. The glycol can be ethylene glycol, or the like. The aldehyde can be acetaldehyde, or the like. Note that, however, reducing agents, which include harmful substances to catalyst in large amounts, or which produce the harmful substances in the subsequent production steps (e.g., drying) or in the heat treatment carried out 1,000° C. or more, are not appropriate for the reducing agents.

When the cerium oxide powder is heat-treated in reducing atmosphere, or when the raw material powders and the reducing agent coexist in the pulverizing operation, part of the cerium oxide is turned into $CeO_{2-x}$ (0<x<0.5). When the zirconium oxide solid solves in the 3-valency-state cerium oxide, the tetragonal zirconium oxide solid-solves in the cerium oxide which keeps being cubic phase, and accordingly the desired composition of resulting solid solution can be adjusted. As a result, the zirconium oxide solid-solves in the cerium oxide in an increased amount, so that almost all of the zirconium oxide can virtually solid-solve in the cerium oxide being in part $CeO_{2-x}$ (0<x<0.5).

When the cerium oxide powder is reduced as aforementioned, it is preferable to use a cerium oxide powder which includes micro-fine and porous particles, in order to enhance the reduction efficiency.

Note that the pulverizing of the raw material powders can preferably be carried out in wet manner. For instance, the cerium oxide powder and the zirconium compound can be dispersed in a dispersing medium to make a slurry, and pulverized thereafter. The dispersing medium can be a liquid reducing agent, such as ethanol, or the like. With such a dispersing medium, solid solution of the zirconium oxide in the cerium oxide can be promoted.

The cerium oxide powder and the zirconium compound can be dispersed in the dispersing medium in any desired manner. It is preferred, however, that the zirconium compound is dispersed more finely therein than the cerium oxide. Under the circumstances, the zirconium compound particles contact with the cerium oxide particles over enlarged surface area, and accordingly are likely to solid-solve in the cerium oxide particles.

Note that the time required for the pulverizing operation depends on to what extent the raw material powders are pulverized. Namely, when the pulverizing operation is carried out with high pulverizing energy, the time required therefor can be shortened.

In addition, it is preferable to carry out an ordinary thermal drying onto the resulting solid solution powder, when it is to be mixed and used with an ordinary powder having an average particle diameter of micrometer order to prepare a catalyst. The ordinary powder can be a gamma-alumina powder, or the like.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
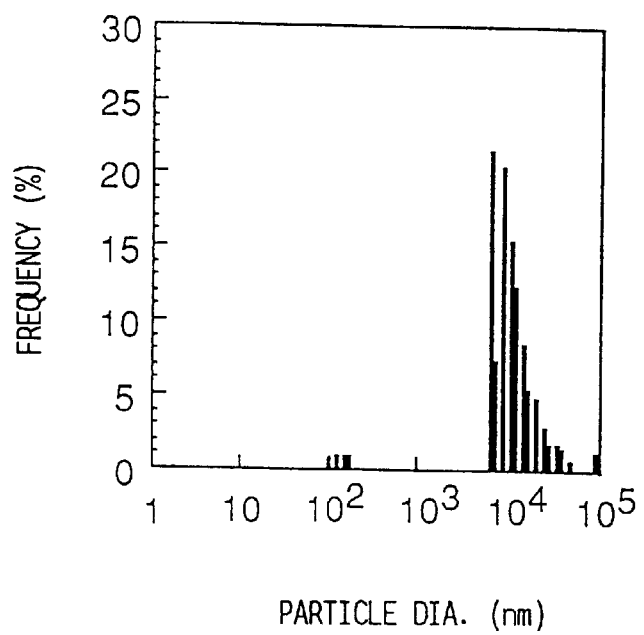
FIG. 1 is a diagram for illustrating a particle-diameter distribution of the raw material powders prior to the pulverizing operation in a Fourth Preferred Embodiment of a catalyst according to the present invention.

Having generally described the present invention, a further understanding can be obtained by reference to the specific preferred embodiments which are provided herein for purposes of illustration only and are not intended to limit the scope of the appended claims.

First Preferred Embodiment

This First Preferred Embodiment was adapted for carrying out the above-described first and third aspects of the present invention.

47 grams of an alumina powder, 1.5 grams of a boehmite (or aluminum hydroxide) powder, 73 grams of a cerium oxide sol, and 25 grams of water were milled by a ball mill for 1 hour. Thereafter, 11.0 grams of aluminum nitrate was added to the mixture, and was milled therewith for extra 30 minutes, thereby preparing a slurry for coating. Note that the cerium oxide sol contained cerium oxide in an amount of 30% by weight, and the cerium oxide colloidal particles had an average particle diameter of 7 nm.

Then, a honeycomb-shaped support substrate formed of cordierite was immersed into the slurry, and thereafter blown to blow away the slurry in excess. The substrate had a diameter of 30 mm and a length of 25 mm. Thereafter, the substrate was dried at 80° C. for 20 minutes, and was calcinated at 650° C. for 1 hour, thereby forming a coating layer on the honeycomb-shaped support substrate. Note that the coating layer increased the weight of the substrate by 3.0 grams.

The honeycomb-shaped support substrate with the coating layer formed thereon was observed by a scanning electron microscope, and found to load cerium oxide particles having an average particle diameter of 35 nm and an alumina porous support having an average pore diameter of 15 nm thereon.

The support substrates having the coating layer thereon was immersed into a platinum aqueous solution (e.g., "P-Salt Solution" made by TANAKA KIKINZOKU Co., Ltd.) having a predetermined concentration, and thereafter it was taken out of the solution and blown to blow away the water droplets in excess. After the blowing, the substrate was dried at 250° C. Then, the substrates was immersed into a rhodium chloride aqueous solution having a predetermined concentration, and thereafter it was taken out of the solution and blown to blow away the water droplets in excess. After the blowing, the substrate was dried at 250° C., thereby preparing the First Preferred Embodiment of a catalyst according to the present invention. Note that Pt was loaded in an amount of 0.0265 grams on the resulting catalyst, and Rh was loaded in an amount of 0.0053 grams thereon.

Second Preferred Embodiment

This Second Preferred Embodiment was adapted for carrying out the above-described second and fourth aspects of the present invention.

47 grams of an alumina powder, 1.5 grams of a boehmite powder, 73 grams of a cerium oxide sol, 10.3 grams of a zirconium oxide sol, and 18 grams of water were milled by a ball mill for 1 hour. Thereafter, 11.0 grams of aluminum nitrate was added to the mixture, and was milled therewith for extra 30 minutes, thereby preparing a slurry for coating. Note that the cerium oxide sol was identical with the one used in the First Preferred Embodiment, and that the zirconium oxide sol contained zirconium oxide in an amount of 30% by weight, and the zirconium oxide colloidal particles had an average particle diameter of 30 nm.

Then, a honeycomb-shaped support substrates formed of cordierite was immersed into the slurry, and thereafter blown to blow away the slurry in excess. The substrate had a diameter of 30 mm and a length of 25 mm. Thereafter, the substrate was dried at 80° C. for 20 minutes, and calcinated at 750° C. for 1 hour, thereby forming a coating layer on the honeycomb-shaped support substrate. Note that the coating layer increased the weight of the substrate by 3.10 grams.

The honeycomb-shaped support substrate with the coating layer formed thereon was examined for crystalline structure by an X-ray diffraction analysis. It was verified that the cerium oxide and zirconium oxide were solid-solved each other to form a solid solution. It was also observed by a scanning electron microscope, and found to have the solid solution whose average particle diameter was 60 nm.

Then, the process set forth in the "First Preferred Embodiment" was followed to likewise load Pt and Rh on the support substrate having the coating layer thereon in the same amounts as the First Preferred Embodiment of the present catalyst. The Second Preferred Embodiment of the present catalyst was thus prepared.

Third Preferred Embodiment

This Third Preferred Embodiment was adapted for carrying out the above-described second and fifth aspects of the present invention.

A plurality of honeycomb-shaped support substrate was impregnated with a zirconyl nitrate aqueous solution having a concentration of 8.5% by weight. Note that the substrate had an identical coating layer with the one which was prepared for the First Preferred Embodiment of the present catalyst. Thereafter, the substrates was dried, and calcinated at 750° C. for 1 hour. Note that these operations increased the weight of the substrate by 0.15 grams, and the total weight of the coating layer and the substrate was increased by 3.15 grams.

The thus treated honeycomb-shaped support substrates was examined for crystalline structure by an X-ray diffraction analysis. It was verified that the cerium oxide and zirconium oxide were solid-solved each other to form a solid solution. It was also observed by a scanning electron microscope, and was found to have the solid solution whose average particle diameter was 35 nm.

Then, the process set forth in the "First Preferred Embodiment" was followed to likewise load Pt and Rh on the support substrate having the coating layer thereon in the same amounts as the First Preferred Embodiment of the present catalyst. The Third Preferred Embodiment of the present catalyst was thus prepared.

Comparative Example Nos. 1 and 2

Comparative Example Nos. 1 and 2 were adapted for carrying out an impregnation-loading process.

47 grams of an alumina powder, 1.5 grams of a boehmite powder, 70 grams of water, and 11.0 grams of aluminum nitrate were milled by a ball mill for 1 hour, thereby preparing a slurry for coating.

Then, two honeycomb-shaped support substrates formed of cordierite were immersed into the slurry, and thereafter each of them was blown to blow away the slurry in excess. The substrates had a diameter of 30 mm and a length of 25 mm. Thereafter, each of the substrates was dried at 80° C. for 20 minutes, and each of them was calcinated at 650° C. for 1 hour, thereby forming a coating layer on the honeycomb-shaped support substrate. Note that the coating layer increased the weight of the substrates by 2.25 grams and 2.20 grams, respectively.

Then, one of the honeycomb-shaped support substrates with the coating layer formed thereon was immersed into a cerium nitrate aqueous solution which included cerium nitrate in an amount of 80% by weight to impregnate the cerium nitrate therein. The other of the substrates was immersed into a mixed aqueous solution which included cerium nitrate in an amount of 70% by weight and zirconyl nitrate in an amount of 8.5% by weight, to impregnate the cerium nitrate and zirconyl nitrate therein. The thus impregnated substrates were dried, and calcinated at 750° C. for 1 hour. Note that the impregnation-loading increased the weight of the substrates by 3.25 gram, 3.20 grams, respectively.

Then, the process set forth in the "First Preferred Embodiment" was followed to likewise load Pt and Rh on each of the support substrates having the coating layer thereon in the same amounts as the First Preferred Embodiment of the present catalyst. Comparative Example Nos. 1 and 2 were thus prepared.

Comparative Example Nos. 3 and 4

Comparative Example Nos. 3 and 4 were adapted for carrying out a powder-loading process.

25 grams of a cerium oxide powder, 47 grams of an alumina powder, 1.5 grams of a boehmite powder, 11.0 grams of alumina nitrate, and 85 grams of water were milled by a ball mill for 1 hour, thereby preparing a slurry for coating. Instead of the cerium oxide powder, a cerium-oxide-and-zirconium-oxide solid-solution powder in which zirconium oxide had been solid-solved in an amount of 12.5% by weight in advance, was prepared in an amount of 25 grams, and milled with the other raw materials similarly, thereby preparing another slurry for coating.

Then, two honeycomb-shaped support substrates formed of cordierite were prepared. One of them was immersed into the former slurry, and the other one of them was immersed into the latter slurry. The substrates had a diameter of 30 mm and a length of 25 mm. Then, each of the substrates was blown to blow away the slurry in excess. Thereafter, each of the substrates was dried at 80° C. for 20 minutes, and each of them was calcinated at 650° C. for 1 hour, thereby forming a coating layer on the honeycomb-shaped support substrate. Note that the coating layers increased the weight of the substrates by 3.10 grams and 3.15 grams, respectively.

Then, the process set forth in the "First Preferred Embodiment" was followed to likewise load Pt and Rh on each of the support substrates having the coating layer thereon in the same amounts as the First Preferred Embodiment of the present catalyst. Comparative Example Nos. 3 and 4 were thus prepared.

First Performance Evaluation

Each of the thus prepared catalysts was subjected to a durability test. In the durability test, each of the catalysts was exposed to a reducing gas and an oxidizing gas alternately for 5 minutes. The compositions of the reducing and oxidizing gases are set forth in Table 1 below. Note that the temperature of the reducing and oxidizing gases was 1,000° C. at the inlet, and that the durability test was carried out for 15 hours. Before the durability test, each of the catalysts was measured for the initial average particle diameter of the cerium oxide or the cerium oxide-zirconium oxide solid solution. Moreover, before and after the durability test, each of the catalysts was measured for the specific surface area. The results of these measurements are summarized in Table 2 below.

TABLE 1

| Composition | $O_2$ | $H_2$ | CO | $C_3H_6$ | $CO_2$ | $H_2O$ | $N_2$ |
|---|---|---|---|---|---|---|---|
| Reducing Gas (% by Volume) | 0.29 | 6.0 | 0.1 | 0.08 | 10.0 | 3.0 | balance |
| Oxidizing Gas (% by Volume) | 3.29 | — | 0.1 | 0.08 | 10.0 | 3.0 | balance |

TABLE 2

| | Form of Ce before Loading | Specific Surface Area ($m^2/g$) | | Average Particle Dia. (nm) |
|---|---|---|---|---|
| | | B.D.T. | A.D.T. | |
| 1st Pref. Embodiment | Ceria Sol | 138 | 22 | 30–40 |
| 2nd Pref. Embodiment | Ceria Sol & Zirconia Sol | 134 | 60 | 60 |
| 3rd Pref. Embodiment | Ceria Sol & Zirconium Nitrate | 133 | 61 | 30–40 |
| Comparative Ex. No. 1 | Cerium Nitrate | 100 | 8 | Not Measurable |
| Comparative Ex. No. 2 | Cerium Nitrate & Zirconium Nitrate | 102 | 24 | Not Measurable |
| Comparative Ex. No. 3 | Ceria Powder | 135 | 26 | 3000 |
| Comparative Ex. No. 4 | Ceria-Zirconia Solid Solution Powder | 136 | 63 | 3000 |

(Note)
"B.D.T." means "before the durability test".
"A.D.T." means "after the durability test".

The catalysts of Comparative Example Nos. 1 and 2 had a smaller initial specific surface area than the other catalysts. Their coating layers had a considerably smaller average particle diameter than the coating layers of the other catalysts so that they could not be measured for the average particle diameter. Accordingly, it is assumed that, in the catalysts of Comparative Example Nos. 1 and 2, the pores of the alumina-based coating layer were closed by loading the cerium oxide and/or zirconium oxide in highly dispersed manner. Moreover, after the durability test, the catalyst of Comparative Example No. 1 had a much more deteriorated specific surface area than those of the First Preferred Embodiment and Comparative Example No. 3, and the catalyst of Comparative Example No. 2 had a much more deteriorated specific surface area than those of the Second and Third Preferred Embodiments and Comparative Example No. 4. It is believed that these phenomena stemmed from the reaction of alumina and cerium oxide.

The catalysts of Comparative Example Nos. 3 and 4 had a specific surface area equal to those of the preferred embodiments, but their coating layers had a remarkably large average particle diameter. Accordingly, it is expected that, in the catalysts of Comparative Example Nos. 3 and 4, the cerium oxide will exhibit a decreased oxygen storage capability.

On the other hand, although, the catalysts of the preferred embodiments had a coating layers having a small average particle diameter, they had a large specific surface area. Concerning their specific surface area degradation after the durability test, the catalyst of the First Preferred Embodiment was degraded as less as that of Comparative Example No. 3, and the catalysts of the Second and Third Preferred Embodiment were degraded as less as that of Comparative Example No. 4. Hence, it is believed that the catalysts of the preferred embodiments will effect a high oxygen storage capability, and will produce good 3-way catalytic performance.

Further, in the catalysts of the preferred embodiments, it is appreciated that the specific surface area could be inhibited from decreasing by solid-solving the zirconium oxide in the cerium oxide. It is assumed that the heat resistance of the cerium oxide is improved by solid-solving the zirconium oxide in the cerium oxide, and that the cerium oxide is kept from reacting with the alumina-based coating layer. As a result, it is expected that the catalysts of the preferred embodiments will effect 3-way catalytic performance, which will deteriorate less even after they are used at elevated temperatures.

Furthermore, the catalysts of the Second and Third Preferred Embodiments verified that the adding processes little affected the advantages which resulted from the zirconium oxide.

Second Performance Evaluation

In order to verify the advantages produced by the present invention, each of the catalysts was subjected to a catalytic performance test. Note that the temperature of the inlet gas was increased in the catalytic performance test.

Specifically, in the catalytic performance test, each of the catalysts was examined for the NO, CO and HC conversions while flowing a reducing gas and an oxidizing gas alternately for 1 second. Note that the inlet temperature of the reducing and oxidizing gases was increased from room temperature to 500° C., and that the NO, CO and HC conversions of the catalysts were evaluated at 350° C., at which the oxygen-storage-and-release capability of the cerium oxide arose. The compositions of the reducing and oxidizing gases are set forth in Table 3 below, and the results of the evaluation are recited and compared in Table 4 below.

TABLE 3

| Composition | $CO + H_2$ | $C_3H_6$ | NO | $O_2$ | $CO_2$ | $H_2O$ | $N_2$ |
|---|---|---|---|---|---|---|---|
| Reducing Gas (% by mole) | 2.5 | 0.05 | 0.1 | 0.6 | 10.0 | 3.0 | balance |
| Oxidizing Gas (% by mole) | 1.0 | 0.05 | 0.1 | 1.35 | 10.0 | 3.0 | balance |

(Note) In the $CO + H_2$ mixture gas, the mixing ratio of CO with respect to $H_2$ is 3 virtually (i.e., $CO/H_2 \div 3$).

TABLE 4

| | Form of Ce before Loading | Conversion (%) | | |
|---|---|---|---|---|
| | | NO | CO | HC |
| 1st Pref. Embodiment | Ceria Sol | 79 | 74 | 84 |
| 2nd Pref. Embodiment | Ceria Sol & Zirconia Sol | 93 | 92 | 95 |
| 3pd Pref. Embodiment | Ceria Sol & Zirconia Sol | 94 | 93 | 96 |
| Commparative Ex. No. 1 | Cerium Nitrate | 63 | 60 | 64 |
| Comparative Ex. No. 2 | Cerium Nitrate & Zirconium Nitrate | 86 | 86 | 89 |
| Comparative Ex. No. 3 | Ceria Powder | 71 | 68 | 82 |
| Comparative Ex. No. 4 | Ceria-Zirconia Solid Solution Powder | 85 | 83 | 93 |

The catalyst of the First Preferred Embodiment exhibited improved NO and CO conversions over those of Comparative Example Nos. 1 and 3. This fact implies that the cerium oxide was highly dispersed in the catalyst of the First Preferred Embodiment because the cerium oxide is added as the cerium oxide sol. Accordingly, the oxygen-storage-and-release capability of the cerium oxide was enhanced in the catalyst of the First Preferred Embodiment. On the other hand, the catalysts of the Comparative Example Nos. 1 and 3 were assumed to be deteriorated in terms of the catalytic performance against NO and CO because the alumina and the cerium oxide reacted to decrease the specific surface area of the coating layer in Comparative Example No. 1, and because the average particle diameter of the cerium oxide was too large to fully effect the oxygen-storage-and-release capability in Comparative Example No. 3.

The catalysts of the Second and Third Preferred Embodiments showed good catalytic performance similarly, which was upgraded remarkably over the catalytic performance of the First Preferred Embodiment. The catalysts of the Second and Third Preferred Embodiments were improved in terms of catalytic performance against NO and CO over those of Comparative Example Nos. 2 and 4 as well. These advantages apparently resulted from the solid-solved zirconium oxide. As a result, the heat resistance of the cerium oxide was enhanced. Thus, after the durability test, the oxygen-storage-and-release capability of the cerium oxide degraded less, and the specific surface area of the alumina was decreased less.

Fourth Preferred Embodiment

This Fourth Preferred Embodiment was adapted for carrying out the above-described second and sixth aspects of the present invention.

In the Fourth Preferred Embodiment, the average particle diameter of particles was measured by a grain-size-distribution meter, to which a photon correlation method was applied. Specifically, the average particle diameters were those of the particles which were present at maximum frequency by weight ratio.

Ethanol was prepared in a volume of 1,500 c.c. Note that the ethanol works as the dispersing agent as well as the reducing agent. The ethanol and 100 grams of a cerium oxide powder were charged in and pulverized by a horizontal media-dispersing mill. The cerium oxide powder included primary particles having an average particle diameter of 6 nm, and secondary particles having an average particle diameter of 10 micrometers ($1.0 \times 10^4$ nm), and had a specific surface area of 100 $m^2/g$. The horizontal media-stirring mill was a "Dyno" mill, which was manufactured by Willey A. Bachofen AG. Note that the mill was provided with inner walls, balls and a stirring impeller, which were made from zirconium oxide, and that the stirring impeller was rotated at 4,000 rpm. The pulverizing operation was carried out for 40 hours, thereby preparing a powder identified with Specimen No. 1.

In the Fourth Preferred Embodiment, the inner wall, the balls and the stirring impeller, which were made from zirconium oxide, were abraded to pieces. The resulting pieces intruded into the cerium oxide powder, whereby the cerium oxide powder and the zirconium oxide were mixed to form a solid solution.

Moreover, 100 grams of a cerium oxide powder was dispersed in water. The cerium oxide powder included primary particles having an average particle diameter of 6 nm, and secondary particles having an average particle diameter of 10 micrometers ($1.0 \times 10^4$ nm), and had a specific surface area of 100 $m^2/g$. The water with the cerium oxide powder dispersed was mixed with 90 grams of an aqueous solution including the dihydrate of zirconyl nitrate. The mixed aqueous solution was neutralized with ammonia, and dried thereafter. Then, instead of the cerium oxide powder which was used to prepare Specimen No. 1, the resulting dried substance was pulverized, thereby preparing a powder identified with Specimen No. 2. Except that the dried substance was used and pulverized for 16 hours, Specimen No. 2 was prepared in the same manner as Specimen No. 1.

Comparative Example No. 5

100 grams of a cerium oxide powder was impregnated with an aqueous solution including the dihydrate of zirconyl nitrate. The cerium oxide powder included primary particles having an average particle diameter of 6 nm, and secondary particles having an average particle diameter of 10 micrometers ($1.0 \times 10^4$ nm), and had a specific surface area of 100 $m^2/g$. Then, the cerium oxide powder with zirconyl nitrate impregnated was thermally treated at 700° C., thereby preparing a comparative powder. The comparative powder included zirconium oxide in an amount of 20% by mole.

Evaluation on Powders

The powders of Specimen Nos. 1 and 2 were subjected to an X-ray diffraction analysis. According to the resulting X-ray diffraction charts, the powders were found to be solid solutions in which the zirconium oxide was evenly solid-solved in the cerium oxide. Note that lattice constants were calculated from shifts of diffraction peaks in order to observe the solid-solved state of the zirconium oxide in the cerium oxide.

Figure 2:
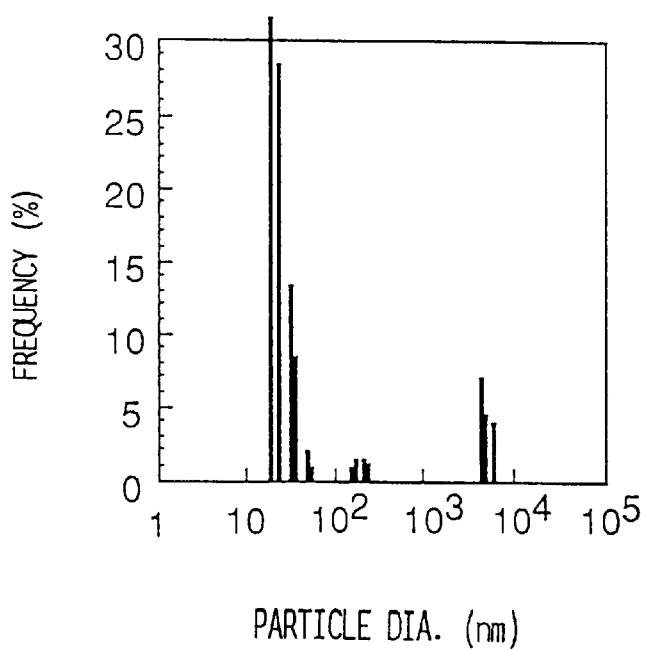
FIG. 2 is a diagram for illustrating a particle-diameter distribution of the raw material powders after the pulverizing operation in the Fourth Preferred Embodiment.

In particular, the powder of Specimen No. 2 as well as the dried substance were subjected to a grain-size-distribution analysis which was based on a photon correlation method. The results of the grain-size-distribution analysis were illustrated in FIGS. 1 and 2. FIG. 1 illustrates the results of the grain-size-distribution analysis conducted onto the dried substance (or the zirconyl-nitrate-loaded cerium oxide powder prior to the pulverizing operation). FIG. 2 illustrates the results of the grain-size-distribution analysis conducted onto the powder of Specimen No. 2. In FIGS. 1 and 2, the vertical axis specifies the existence frequency, which was measured by a grain-size-distribution meter, and which was expressed in existence rate by weight. The grain-size-distribution meter was an application of a photon correlation method. Note that the powder of Specimen No. 1 exhibited a grain-size distribution which was substantially similar to FIG. 2.

It is understood from FIGS. 1 and 2 that most of the particles were pulverized by the pulverizing operation, and that the powder of Specimen No. 2 included particles, which had an average particle diameter of 20 nm, in the largest number. Thus, the powders of the Fourth Preferred Embodiment were found to include particles, which had an average particle diameter of 100 nm or less, in an amount of 70% by weight or more.

In the Fourth Preferred Embodiment, the horizontal media-stirring mill included the inner wall, the balls and the stirring impeller, which were made from zirconium oxide. As a result, the inner wall, the balls and the stirring impeller were abraded to produce zirconium oxide pieces. The thus produced pieces were solid-solved in the cerium oxide powder. The longer the pulverizing operation was carried out, the larger the zirconium oxide was solid-solved in the cerium oxide.

Further, as can be appreciated from the powder of Specimen No. 2, it was understand that the zirconium oxide can be solid-solved in a large amount by controlling the amount of the zirconium oxide powder or the dihydrate of zirconyl nitrate to be added.

Figure 3:
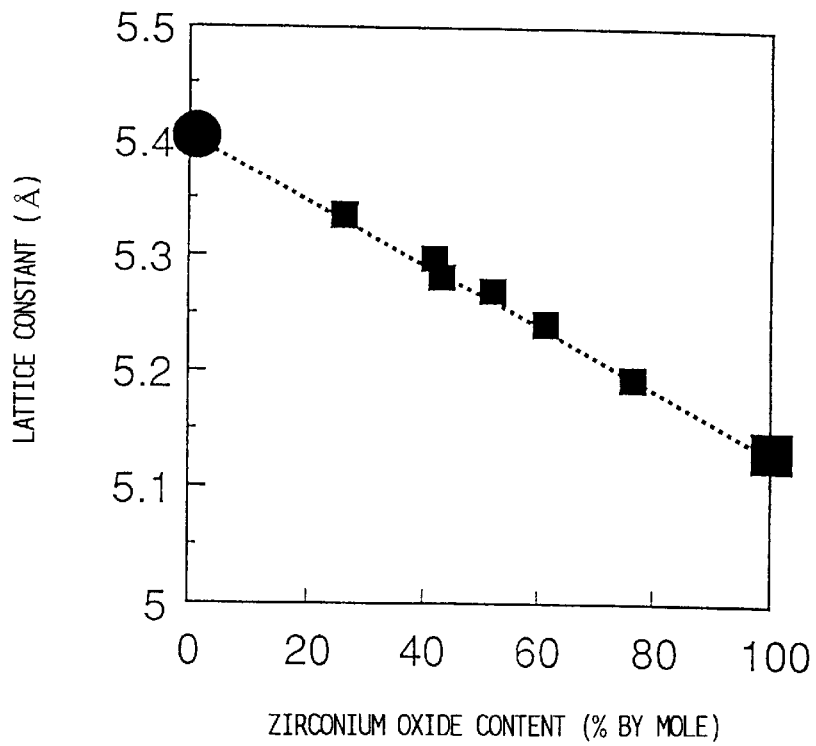
FIG. 3 is a diagram for illustrating how the lattice constant of the resulting solid solution powder depends on the zirconium content in the raw material powders in the Fourth Preferred Embodiment.

Furthermore, except that the compositing ratio of Ce and Zr was varied diversely, a variety of powders were prepared in the same manner as the powder of Specimen No. 1. FIG. 3 illustrates a relationship between the zirconium oxide content of the powders and the lattice constant thereof. Note, in FIG. 3, that the zirconium oxide content of the powders is expressed by mole % with respect to the total amount of the cerium oxide and zirconium oxide, taken as 100 mole %.

As illustrated by the broken line of FIG. 3, the relationship between the zirconium oxide content and the lattice constant apparently followed the Vegard's principle. FIG. 3 shows that almost all of the zirconium oxide was solid-solved in the cerium oxide.

On the other hand, in the powder of Comparative Example No. 5, about 20% of the added zirconium oxide was solid-solved in the cerium oxide, and the rest of 80% was not solid-solved but was present as simple zirconium oxide. In addition, the powder included particles, which had an average particle diameter of 5,000 nm or more, in an amount of 95% by weight or more.

Moreover, the powders of Specimen No. 2 and Comparative Example No. 5 were mixed with a gamma-alumina powder. Note that Ce and Zr were mixed in a mixing ratio of 5:5 (i.e., Ce:Zr=5:5) by weight in the powders, and that the gamma-alumina powder had been prepared in an amount of 2.5 times as much as the powders. Then, platinum and rhodium were added to the mixture in an amount of 1 gram and 0.2 grams, respectively, with respect to 100 grams of the gamma-alumina powder. Two catalysts were thus prepared.

Figure 4:
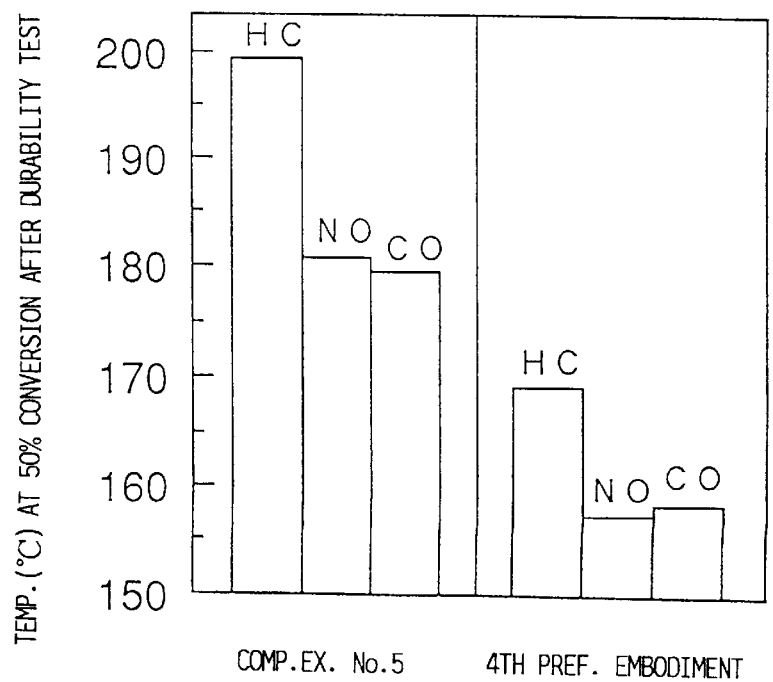
FIG. 4 is a diagram for illustrating the temperatures at 50%-conversions of a catalyst, and a comparative automotive catalyst which are formed of the solid solution powder prepared in a Fourth Preferred Embodiment, and the comparative solid solution powder prepared in a Comparative Example No. 5, respectively, and have been both subjected to a durability test.

The two catalysts were subjected to a durability test. Note that, in the durability test, the catalysts were exposed to a exhaust gas, whose temperature was held at 1,000° C., for 5 hours. Thereafter, the catalysts were examined for the CO, NO and hydrocarbon (HC) conversions. FIG. 4 illustrates the temperatures, at which the catalysts exhibited CO, NO and HC conversions of 50% (hereinafter referred to as "50%-conversion temperatures").

FIG. 4 shows that, after the durability test, the automotive catalyst formed of the powder of Specimen No. 2 exhibited lower 50%-conversion temperatures for the exhaust-gas components than the automotive catalyst formed of the powder of Comparative Example No. 5. It is understood from FIG. 4 that the catalyst formed of the powder of the Fourth Preferred Embodiment had high catalytic performance.

Supplemental Comparative Example 40 grams of a cerium oxide sol, and 70 grams of a zirconium oxide sol were mixed. The resulting mixture was stirred, and an ammonia aqueous solution was added to the mixture, thereby precipitating a cerium oxide-zirconium oxide mixture. The cerium oxide sol included cerium oxide in an amount of 15% by weight, and had an average particle diameter of 7 nm. The zirconium oxide sol included zirconium oxide in an amount of 20% by weight, and had an average particle diameter of 30 nm. The precipitated cerium oxide-zirconium oxide mixture exhibited a final pH of about 9, and its cerium oxide/zirconium oxide ratio was 30/70 by weight.

The resulting precipitate was collected by filtration, and washed with water. Then, the precipitate was charged in a drier, and dried at 110° C. for 12 hours. Thereafter, part of the dried precipitate was calcinated at 600° C. for 3 hours while flowing air. The resulting product was examined for the BET specific surface area, and was found to have a BET specific surface area of 87 m$^2$/g. Further, the rest of the dried precipitate was calcinated at 900° C. for 3 hours while flowing air. The resulting product was examined for the BET specific surface area, and was found to have a BET specific surface area of 33 m$^2$/g.

It is believed that the resulting products were solid solutions of cerium oxide and zirconium oxide. However, when the powders of Supplemental Comparative Example were prepared as set forth above, they were agglomerated during the drying operation which was carried out at 110° C. Accordingly, it was necessary to pulverize the products in order to prepare the solid solution powder of the present invention which has an average particle diameter of from 5 to 100 nm. Specifically, it was difficult to utilize the products which were produced by the above-described process of the Supplemental Comparative Example, for preparing an catalyst according to the present invention.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying exhaust gases, comprising:
a porous support;
a cerium oxide loaded on said porous support, and having an average secondary particle diameter of from 5 to 100 nm, said average secondary particle diameter being large enough to prevent most of the cerium oxide from entering pores of said porous support, and wherein 50% or more by weight of the particles have an average secondary particle diameter of 100 nm or less; and
a noble metal element loaded on said porous support.

2. A catalyst for purifying exhaust gases, comprising:
a porous support;
a solid solution in which a cerium oxide and a zirconium oxide are present in a state of mutual solid solution, and the cerium oxide is present in an amount of from 0.2 to 4.0 by molar ratio with respect to the zirconium oxide, said solid solution being loaded on said porous support and having an average secondary particle diameter of from 5 to 100 nm, said average secondary particle diameter being large enough to prevent most of the solid solution from entering pores of said porous support, and wherein 50% or more by weight of the particles have an average secondary particle diameter of 100 nm or less; and
a noble metal element loaded on said porous support.

3. The catalyst according to claim 1 or 2, wherein said porous support includes at least one member selected from the group consisting of alumina, silica, silica-alumina, zirconia, and titania.

4. The catalyst according to claim 1 or 2, wherein said cerium oxide or said solid solution is loaded on said porous support in an amount of from 10 to 200 grams with respect to 100 grams of said porous support.

5. The catalyst according to claim 1 or 2, wherein said noble metal element is at least one element selected from the group consisting of platinum (Pt), palladium (Pd), and rhodium (Rh).

6. The catalyst according to claim 5, wherein said noble metal element is at least one element selected from the group consisting of Pt and Pd, and loaded in a total amount of from 0.1 to 10 grams with respect to 100 grams of said porous support.

7. The catalyst according to claim 5, wherein said noble metal element is Rh, and loaded in an amount of from 0.01 to 2.0 grams with respect to 100 grams of said porous support.

8. The catalyst according to claim 5, wherein said Rh is loaded in an amount of from 0.01 to 2.0 gram with respect to 100 grams of said porous support, and said Pt and/or Pd is loaded in a total amount of from 0.1 to 10 grams with respect to 100 grams of said porous support.

9. The catalyst according to claim 8, wherein said Rh is loaded in a molar ratio of from 0.01 to 1.0 or less with respect to a total loading amount of said Pt and/or Pd.

10. A process for producing a catalyst, comprising the steps of:
preparing a slurry of a porous support powder and a cerium oxide sol;
coating and calcinating the slurry on a surface of a support substrate so as to form a coating layer comprising a cerium oxide having an average secondary particle diameter of from 5 to 100 nm thereon, and wherein 50% or more by weight of the particles have an average secondary particle diameter of 100 nm or less; and
loading a noble metal element on the coating layer.

11. A process for producing a catalyst, comprising the steps of:
preparing a slurry of a porous support powder, a cerium oxide sol and a zirconium oxide sol;
coating and calcinating the slurry on a surface of a support substrate so as to form a coating layer comprising a solid solution in which a cerium oxide and a zirconium oxide exist in a state of mutual solid solution, and the cerium oxide is present in an amount of from 0.2 to 4.0 by molar ratio with respect to the zirconium oxide;
said solid solution having an average secondary particle diameter of from 5 to 100 nm, and wherein 50% or more by weight of the particles have an average secondary particle diameter of 100 nm or less; and loading a noble metal element on the coating layer.

12. A process for producing a catalyst, comprising the steps of:

preparing a slurry of a porous support powder and a cerium oxide sol;

coating and calcinating the slurry on a surface of a support substrate so as to form a cerium oxide coating layer thereon;

impregnating a solution of a zirconium oxide compound into the coating layer, and calcinating the impregnated coating layer to obtain a solid solution of a cerium oxide and a zirconium oxide, said solid solution having an average secondary particle diameter of from 5 to 100 nm, and wherein 50% or more by weight of the particles have an average secondary particle diameter of 100 nm or less, and a molar ratio of the cerium oxide to the zirconium oxide in a range of from 0.2 to 4.0; and loading a noble metal element on the coating layer.

13. A process for producing a catalyst, comprising the steps of:

preparing a slurry of a porous support powder and a solid solution powder in which a cerium oxide and a zirconium oxide exist in a state of mutual solid solution, and particles in an amount of 50% by weight or more therein have an average particle diameter of 100 nm or less;

coating and calcinating the slurry on a surface of a support substrate so as to form a coating layer of a solid solution having an average particle diameter of from 5 to 100 nm, the solid solution comprising the cerium oxide and the zirconium oxide in a state of mutual solid solution, the cerium oxide being present in an amount of 0.2 to 4.0 by molar ratio with respect to the zirconium oxide; and loading a noble metal element on the coating layer.

14. The process according to claim 10, 11, 12 or 13, wherein said a porous support powder comprises at least one member selected from the group consisting of alumina, silica, silica-alumina, zirconia, and titania.

15. The process according to claim 10, 11, 12 or 13, wherein said cerium oxide or said solid solution is loaded on said porous support powder in an amount of from 10 to 200 grams with respect to 100 grams of said porous support powder.

16. The process according to claim 10, 11, 12 or 13, wherein said noble metal element is at least one element selected from the group consisting of platinum (Pt), palladium (Pd), and rhodium (Rh).

17. The process according to claim 16, wherein said noble metal element is at least one element selected from the group consisting of Pt and Pd, and loaded in an amount of from 0.1 to 10 grams with respect to 100 grams of said porous support powder.

18. The process according to claim 16, wherein said noble metal element is Rh, and loaded in an amount of from 0.01 to 2.0 gram with respect to 100 grams of said porous support powder.

19. The process according to claim 16, wherein said Rh is loaded in an amount of from 0.01 to 2.0 gram with respect to 100 grams of said porous support powder, and said Pt and/or Pd is loaded in an amount of from 0.1 to 10 grams with respect to 100 grams of said porous support powder.

20. The process according to claim 13, wherein said particles in an amount of 80% by weight or more in said solid solution powder have an average particle diameter of 50 nm or less.

21. The process according to claim 13, further comprising a step of pulverizing raw materials for the cerium oxide and the zirconium oxide by a pulverizer capable of producing a centrifugal acceleration of from 10 to 100 times as much as the gravitational acceleration, thereby preparing said solid solution powder for said preparing step.

22. The process according to claim 21, further comprising a step of heating, prior to and during said pulverizing step, said raw materials for the cerium oxide in a reducing atmosphere in a temperature range of from 300 to 1,200° C., thereby promoting said mutual solid solution in said solid solution powder.

23. The process according to claim 21, wherein, in said pulverizing step, a reducing agent is added to the raw materials to promote said mutual solid solution in said solid solution powder, said reducing agent being at least one member selected from the group consisting of alcohol, glycol, glycerin, and aldehyde.

24. The process according to claim 21, wherein said pulverizing step is carried out in wet manner.

25. The catalyst of claim 1, wherein 80% or more by weight of the particles have an average secondary particle diameter of 50 nm or less.

26. The catalyst of claim 2, wherein 80% or more by weight of the particles have an average secondary particle diameter of 50 nm or less.

27. The process of claim 10, wherein 80% or more by weight of the particles have an average secondary particle diameter of 50 nm or less.

28. The process of claim 11, wherein 80% or more by weight of the particles have an average secondary particle diameter of 50 nm or less.

29. The process of claim 12, wherein 80% or more by weight of the particles have an average secondary particle diameter of 50 nm or less.

30. The catalyst of claim 1, wherein said average secondary particle diameter is as measured by an electron microscope or a particle-size-distribution meter.

31. The catalyst of claim 2, wherein said average secondary particle diameter is as measured by an electron microscope or a particle-size-distribution meter.

32. The process of claim 10, wherein said average secondary particle diameter is as measured by an electron microscope or a particle-size-distribution meter.

33. The process of claim 11, wherein said average secondary particle diameter is as measured by an electron microscope or a particle-size-distribution meter.

34. The process of claim 12, wherein said average secondary particle diameter is as measured by an electron microscope or a particle-size-distribution meter.

* * * * *